United States Patent [19]

Adam

[11] Patent Number: 5,076,534
[45] Date of Patent: Dec. 31, 1991

[54] BASE SUPPORT FOR AIR CONDITIONERS OR THE LIKE

[75] Inventor: Courtney Adam, Sioux City, Iowa

[73] Assignee: Bramec Corporation, N. Sioux City, S. Dak.

[21] Appl. No.: 583,585

[22] Filed: Sep. 17, 1990

[51] Int. Cl.⁵ .......................................... F16M 13/00
[52] U.S. Cl. ...................................... 248/678; 52/590; 52/591; 52/594
[58] Field of Search ............... 248/678, 670, 676, 679, 248/158, 188.1, 346, 910; 52/591, 590, 594; 108/56.1, 51.1; 428/44, 58

[56] References Cited

U.S. PATENT DOCUMENTS

| | | |
|---|---|---|
| 543,582 | 7/1895 | Meyenberg . |
| 746,399 | 12/1903 | Staples ................................ 52/591 |
| 923,975 | 6/1909 | Johnston . |
| 1,852,715 | 4/1932 | Greenebaum . |
| 2,310,426 | 2/1943 | Greulich . |
| 3,650,224 | 3/1972 | Petix .................................. 108/56.1 |
| 3,713,620 | 1/1973 | Tkach . |
| 3,790,115 | 2/1974 | Fox . |
| 4,099,626 | 7/1978 | Magnussen .......................... 248/68.1 |
| 4,189,125 | 2/1980 | Little . |
| 4,287,693 | 9/1981 | Collette . |
| 4,373,306 | 2/1983 | Rech . |
| 4,497,858 | 2/1985 | DuPont . |
| 4,842,905 | 6/1989 | Stech .................................. 428/58 |

FOREIGN PATENT DOCUMENTS 1152008  2/1958  France ................................ 52/591

Primary Examiner—Ramon O. Ramirez
Assistant Examiner—Robert A. Olson
Attorney, Agent, or Firm—Shlesinger, Arkwright & Garvey

[57] ABSTRACT

A modular member for forming a base support mount for a machine and the like, comprises a box-like member having a top wall and connected first, second, third and fourth side walls and an open bottom; the first and second side walls being adjacent and identical to each other; the third and fourth side walls being adjacent and identical to each other; the first and second walls each including at least one longitudinal T-shaped projection disposed outwardly from the respective wall; the projection having a top end portion disposed below the top wall; the third and fourth walls each including at least one complementary recess disposed inwardly from the respective wall and adapted to slidingly interlock with a corresponding projection on an adjacent member; the recess having an end wall for engaging the corresponding top end portion of the projection; and the member including a plurality of reinforcing ribs disposed within the member and operably secured to the top wall and the side walls.

22 Claims, 3 Drawing Sheets

U.S. Patent    Dec. 31, 1991    Sheet 1 of 3    5,076,534
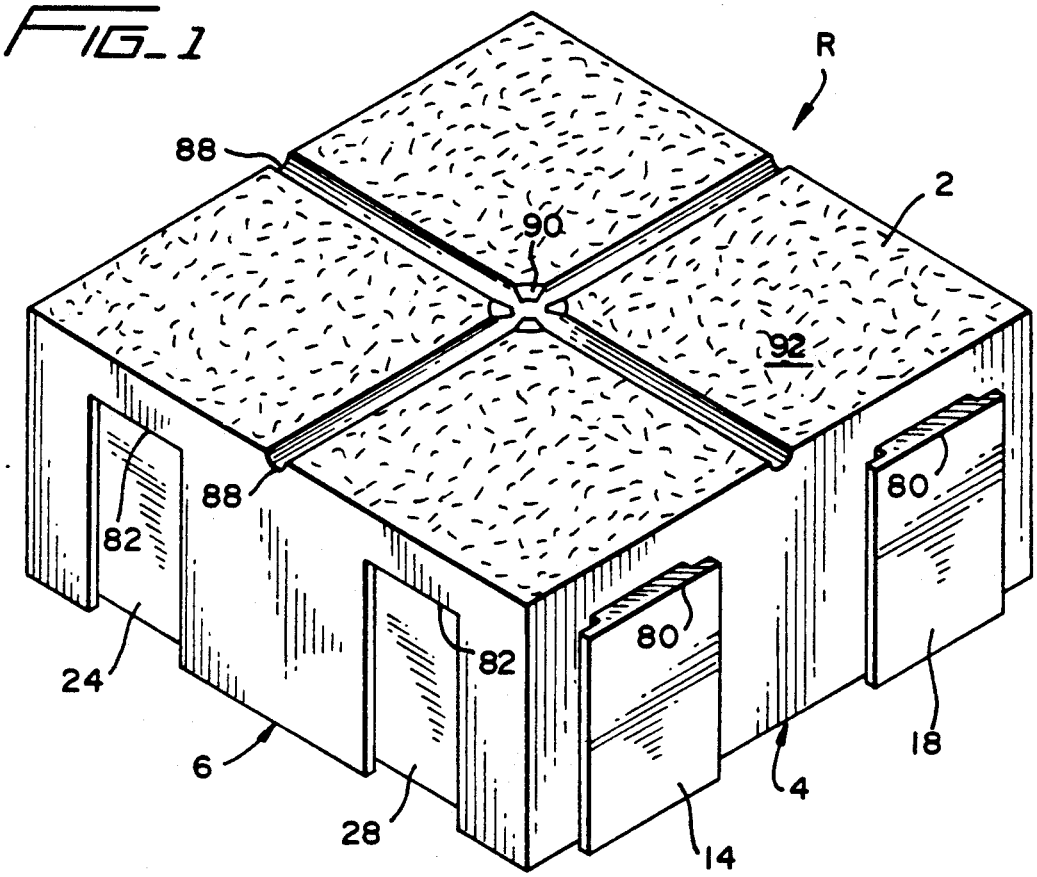
FIG_1
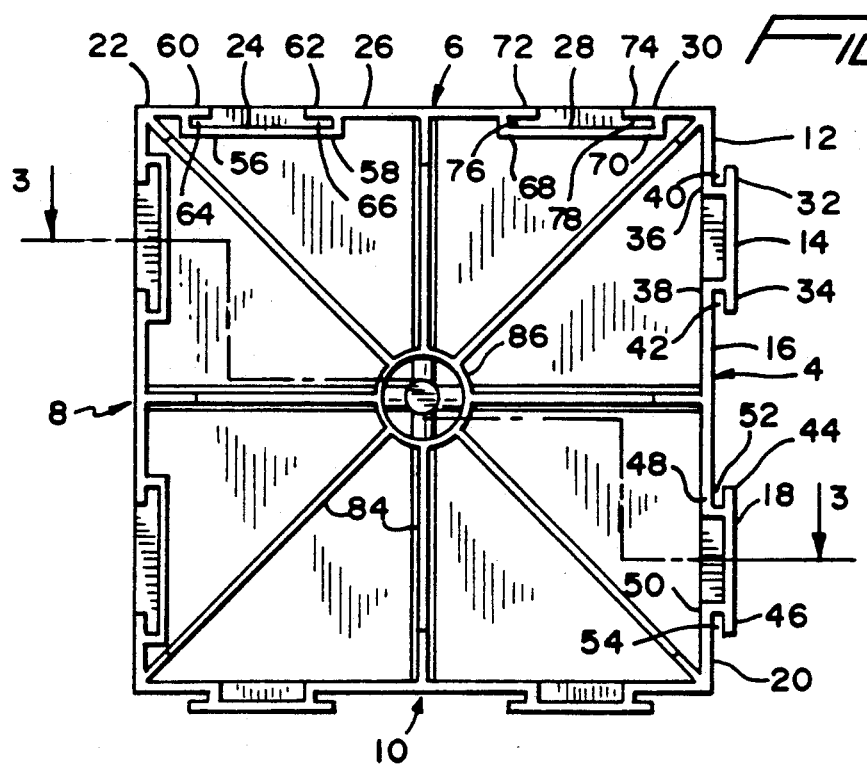
FIG_2

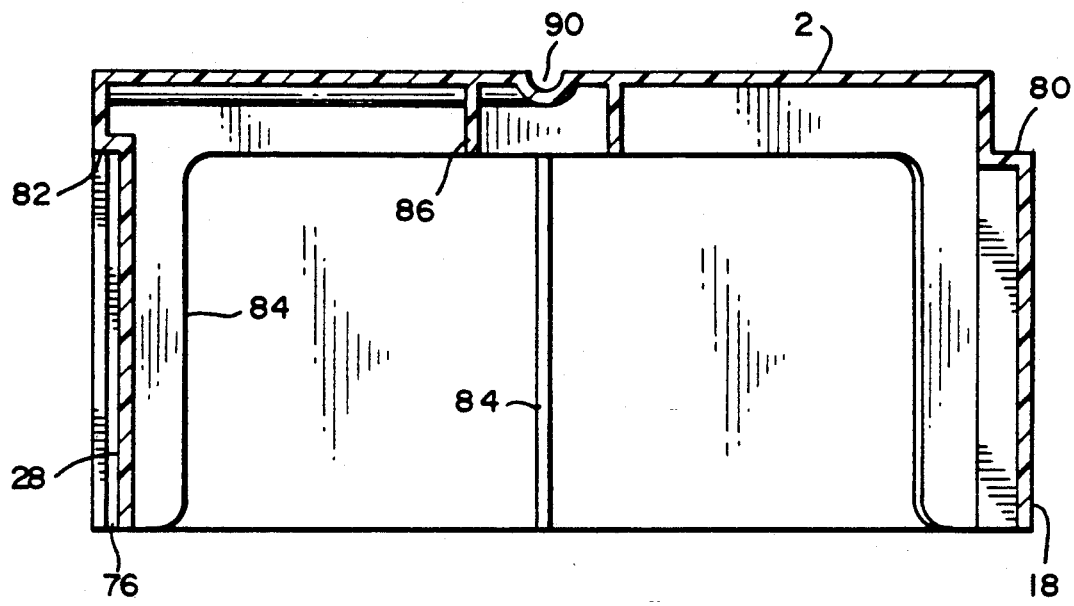
FIG_3
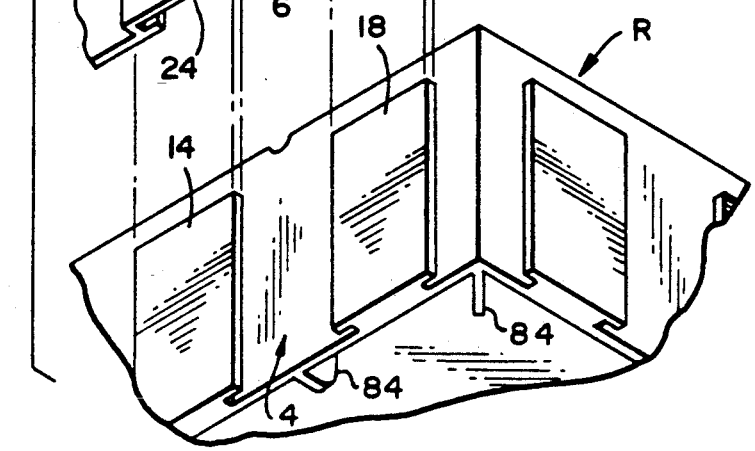
FIG_4

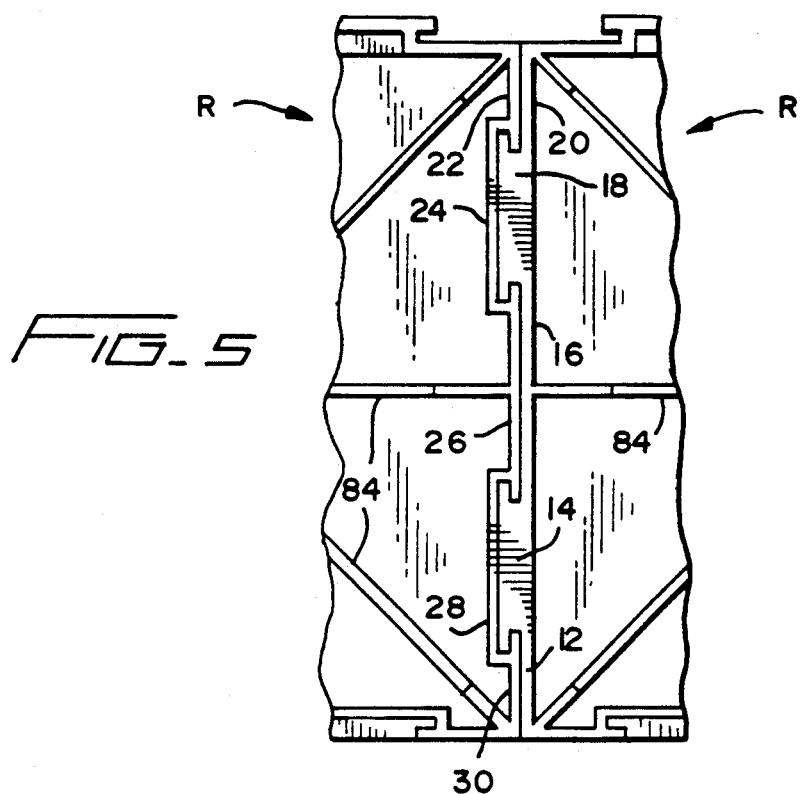
FIG_5
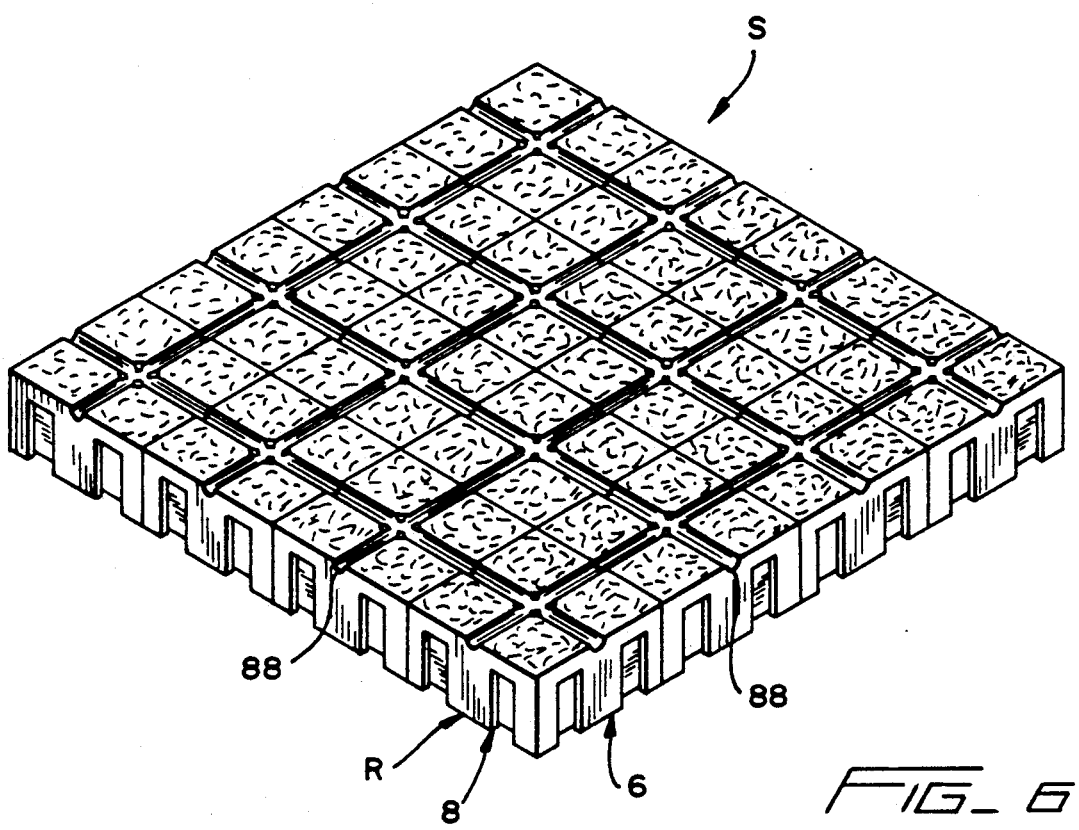
FIG_6

BASE SUPPORT FOR AIR CONDITIONERS OR THE LIKE

FIELD OF THE INVENTION

The present invention relates generally to a base support for air conditioners or the like.

BACKGROUND OF THE INVENTION

Air conditioning equipment such as condenser unit is usually supported on a board or precast concrete slab. Precast slabs are very heavy and require the services of a number of workers to transport, handle and install. Also, the slab must be placed upon a carefully level ground surface.

Furthermore, the slab must be made for the type of equipment that it is going to support.

The use of slabs poured at the site is time consuming because it requires the preparation of a form or cavity to which concrete is poured, requires the accurate positioning of bolts or other machine anchoring means in accordance with the requirements of the machine to be mounted thereon and requires a waiting period until the concrete slab has cured.

There is therefore a need for providing a base support for air conditioners or the like that can be easily installed on site to any size to fit the requirement of the equipment.

OBJECTS AND SUMMARY OF THE INVENTION

It is therefore an object of the present invention to provide a base support for air conditioners or the like that can be easily assembled on site and to any size to fit the requirement of the equipment to be mounted thereon.

It is another object of the present invention to provide a base support for air conditioners or the like that is lightweight and easily handled by a single worker.

It is still another object of the present invention to provide a base support for air conditioners or the like that saves the time and materials spent on setting the form for a poured concrete slab.

It is yet another object of the present invention to provide a base support for air conditioners or the like that is immediately available for use once it is assembled on site.

It is still further another object of the present invention to provide a base support for air conditioners or the like that is made from plastic material that does not break down from exposure to the weather.

In summary, the present invention provides a base support for air conditioners or the like that a convenient, easy to use, assembly or install.

These and other objects of the present invention will become apparent from the following detailed description.

BRIEF DESCRIPTIONS OF THE DRAWINGS

FIG. 1 is a top perspective view of a modular member used to form a base support in accordance with the present invention.

FIG. 2 is a bottom view of FIG. 1.

FIG. 3 is a cross-sectional view taken along line 3—3 in FIG. 2.

FIG. 4 is a fragmentary exploded view of two adjacent modular members forming a portion of a base support in accordance with the present invention.

FIG. 5 is a fragmentary bottom view of two adjacent modular members in an interlocking position in accordance with the present invention.

FIG. 6 is a top perspective view of a base support assembled from a plurality of modular members in accordance with the present invention.

DETAILED DESCRIPTION OF THE INVENTION

A box like modular member R in accordance with the present invention is disclosed in FIG. 1. The member R includes a top wall 2 and connected side walls 4, 6, 8 and 10, each of which is disposed substantially transversely to the top wall 2, as best shown in FIGS. 1 and 2. The top wall 2 is preferably square in plan view. The adjacent walls 4 and 10 are identical to each other. The adjacent walls 6 and 8 are also identical to each other. Each of the walls 4 and 10 includes wall portions 12, 14, 16, 18 and 20. Each of the walls 6 and 8 includes wall portions 22, 24, 26, 28 and 30, as best shown in FIGS. 1 and 2. Each of the walls 4, 6, 8 and 10 is symmetrical about a vertical centerline (not shown) of each wall.

Since the walls 4 and 10 are identical, only the wall 4 will be described in detail below, with the understanding that the description will also apply to corresponding portions of the wall 8. Similarly, only the wall 6 will be described in detail, since the wall 6 is identical to the wall 8.

The wall portions 12, 16 and 20 lie on one plane and the wall portions 14 and 18 lie on a parallel plane. Similarly, the wall portions 22, 26 and 30 lie on another plane and the wall portions 24 and 28 lie on a separate parallel plane. The wall portions 14 and 18 are disposed outwardly from the wall portions 12, 16 and 20, while the wall portions 24 and 28 are disposed inwardly away from the wall portions 22, 26 and 30, as best shown in FIGS. 1 and 2. The wall portions 14 and 18 has edge portions 32 and 34 that extend over edge portions 36 and 38 of wall portions 12 and 16, respectively, thereby forming channels 40 and 42, respectively.

The wall portion 18 also has edge portions 44 and 46 that extend over edge portions 48 and 50, respectively, thereby forming channels 52 and 54, respectively.

The wall portion 24 has edge portions 56 and 58 that spacedly overlap corresponding edge portions 60 and 62 of corresponding wall portions 22 and 26, thereby forming channels 64 and 66. The wall portion 28 has edge portions 68 and 70 that spacedly overlap corresponding edge portions 72 and 74 of corresponding wall portions 26 and 30, thereby forming channels 76 and 78.

Each of the wall portions 14 and 18 has a longitudinal axis that is disposed transversely to the top wall 2. Similarly, each of the wall portions 24 and 28 has a longitudinal axis that is disposed transversely to the top wall 2. The wall portions 4 and 18 each includes a top edge portion 80 that is disposed below the top wall 2. Similarly, the wall portions 24 and 28 each has a top edge portion 82 that is disposed below the top wall 2.

The wall 4 or 10 is adapted to be a complement of either of the walls 6 and 8 such that if the wall 4 disposed on a separate member R, then the wall 4 will interfit with the wall 6 or 8, as best shown in FIGS. 4 and 5. The wall portions 14 and 18 will engage the wall portions 28 and 24, respectively. Similarly, the wall portions 12, 16 and 20 will engage the wall portions 30, 26 and 22, respectively. The edge portions 32, 34, 44 and 46 will fit within the channels 78, 76, 66 and 64, respectively. The edge portions 60, 62, 72 and 74 will fit within the channels 54, 52, 42 and 40, respectively. Finally, the top edge portions 80 of each of the wall portions 14 and 18 will engage the corresponding top edge portions 82 of each of the wall portions 24 and 28. When the walls 4 and 6 are completely interlocked together, the top edge portions 80 will not be visible when viewed from the top, as best shown in FIG. 6.

The wall portions 14 and 18 each forms a T-shaped projection in cooperation with respective channels 40, 42, 52 and 54, as best shown in FIGS. 2 and 5. The wall portions 24 and 28 each forms a C-shaped recess with respective channels 60, 62, 76, and 78.

The wall portions 12-20 and 22-30 have uniform thickness.

Reinforcing ribs 84 are operably connected to the top wall 2 and the side walls 4, 6, 8 and 10. A reinforcing ring 86, disposed centrally and below the top wall 2, is secured to the top wall 2 and to the reinforcing ribs 84, as best shown in FIGS. 2 and 3. The reinforcing ribs 84 are substantially U-shaped, as best shown in FIG. 3.

The top wall 2 includes a pair of grooves 88 that are disposed transversely to each other and to the respective side walls 4, 6, 8 and 10. A depression 90 is disposed at the intersection of the grooves 88, as best shown in FIGS. 1 and 3. The top wall 2 has an outer surface 92 that is heavily textured to provide gripping means for the equipment (not shown) being supported.

A base support S for airconditioners or the like is disclosed in FIG. 6. The support S is formed from a plurality of interconnected members R wherein the wall 4 in one member is interlocked with a complementary wall 6 or 8 in another member R, as best shown in FIGS. 4 and 5. Although the base support S is shown as a square in plan view, one of ordinary skill in the art will understand that the base support S can be made in any configuration and in any size to fit the requirement of the equipment needing the base support.

Although the invention is disclosed as a base support for air conditioners, one of ordinary skill in the art will understand that the base support S may be used for other machinery or other equipment requiring a base support.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A modular member for forming a base support mount for a machine and the like, comprising:
   a) a box-like member having a top wall and connected first, second, third and fourth side walls and an open bottom;
   b) said first and second side walls being adjacent and identical to each other;
   c) said third and fourth side walls being adjacent and identical to each other;
   d) said first and second walls each including at least one longitudinal "T"-shaped projection disposed outwardly from the respective wall;
   e) said at least one projection having a top end portion disposed below said top wall;
   f) said third and fourth walls each including at least one complementary recess disposed inwardly from the respective wall and adapted to slidingly interlock with said at least one projection on an adjacent member;
   g) said at least one recess having an end wall for engaging said top end portion of said at least one projection on the adjacent member;
   h) plurality of reinforcing ribs disposed within said box-like member and operably secured to said top wall and said side walls;
   i) a ring secured centrally underneath said top wall; and
   j) said ribs are connected to said ring.

2. A modular member as in claim 1, wherein:
   a) said reinforcing ribs are substantially "U"-shaped.

3. A modular member as in claim 1, wherein:
   a) said member is square in plan view.

4. A modular member as in claim 1, wherein:
   a) said top wall includes a top surface having grooves.

5. A modular member as in claim 1, wherein:
   a) said at least one projection includes a base portion secured to the respective wall and lateral edge portions projecting from said base portion and spaced from the respective wall.

6. A modular member as in claim 1, wherein:
   a) said at least one recess is substantially C-shaped in cross-section.

7. A modular member as in claim 1, wherein:
   a) said member includes at least a pair of said at least one projection and at least a pair of said at least one complementary recess.

8. A modular member as in claim 1, wherein:
   a) said at least a pair of projections and recesses each includes a longitudinal axis and each of said axes is disposed substantially transverse to said top wall.

9. A modular member as in claim 1, wherein:
   a) said walls are substantially transverse to said top wall.

10. A modular member as in claim 1, wherein:
    a) said top wall includes a top surface; and
    b) said top surface is textured.

11. A modular member as in claim 10, wherein:
    a) said top wall includes first and second grooves disposed on said top surface; and
    b) said grooves are substantially transverse to each other.

12. A modular member for forming a base support mount for a machine and the like, comprising:
    a) a box-like member having a top wall and connected first, second, third and fourth side walls and an open bottom;
    b) said side walls having uniform thickness;
    c) said walls each including parallel first, second, third, fourth and fifth portions;
    d) said second and fourth portions being disposed between said first and third portions, and between said third and fifth portions, respectively;
    e) said first, third and fifth portions being substantially co-planar;
    f) said second and fourth portions being substantially co-planar;
    g) said second and fourth portions on one of said walls and on an opposite wall being disposed away from respective walls in the same direction;

h) means for interlocking said second and fourth wall portions disposed on one of said walls with opposite second and fourth wall portions disposed on an adjacent member;
i) a cylinder secured centrally underneath said top wall; and
j) said ribs are connected to said cylinder.

13. A modular member as in claim 12, wherein:
a) said member includes a plurality of reinforcing ribs disposed within said member and operably secured to said top wall and said side walls; and
b) said reinforcing ribs are substantially U-shaped.

14. A modular member as in claim 12, wherein:
a) said member is square in plan view.

15. A modular member as in claim 12, wherein:
a) said top wall includes a top surface; and
b) said top surface is textured.

16. A modular member as in claim 12, wherein:
a) said top wall includes first and second grooves disposed on said top surface; and
b) said grooves are substantially transverse to each other.

17. A modular member as in claim 12, wherein:
a) said first, third and fifth portions include edge portions; and
b) said second and fourth portions include edges portions extending over respective edge portions of said first, third and fifth portions for forming a channel therebetween.

18. A modular member as in claim 17, wherein:
a) said edge portions of said second and fourth portions disposed on one of said walls are each adapted to fit within opposite said channel disposed on an adjacent member.

19. A modular member for forming a base support mount for a machine and the like, comprising:
a) a box-like member having a top wall and connected first, second third and fourth side walls and an open bottom;
b) said first and second side walls being adjacent and identical to each other;
c) said third and fourth side walls being adjacent and identical to each other;
d) said first and second walls each including at least one longitudinal "T"-shaped projection disposed outwardly from the respective wall;
e) said at least one projection having a top end portion disposed below said top wall;
f) said third and fourth walls each including at least one complementary recess disposed inwardly from the respective wall and adapted to slidingly interlock with said at least one projection on an adjacent member;
g) said at least one recess having an end wall for engaging said top end portion of said at least one projection on the adjacent member;
h) a plurality of reinforcing ribs disposed within said box-like member and operably secured to said top wall and said side walls; and
i) said top wall including a textured top surface.

20. A modular member for forming a base support mount for a machine and the like, comprising:
a) a box-like member having a top wall and connected first, second, third and fourth side walls and an open bottom;
b) said first and second side walls being adjacent and identical to each other;
c) said third and fourth side walls being adjacent and identical to each other;
d) said first and second walls each including at least one longitudinal "T"-shaped projection disposed outwardly from the respective wall;
e) said at least one projection having a top end portion disposed below said top wall;
f) said third and fourth walls each including at least one complementary recess disposed inwardly from the respective wall and adapted to slidingly interlock with said at least one projection on an adjacent member;
g) said at least one recess having an end wall for engaging said top end portion of said at least one projection on the adjacent member;
h) a plurality of reinforcing ribs disposed within said box-like member and operably secured to said top wall and said side walls; and
i) said top wall including a top surface having grooves.

21. A modular member for forming a base support mount for a machine and the like, comprising:
a) a box-like member having a top wall and connected first, second, third and fourth side walls and an open bottom;
b) said side walls having uniform thickness;
c) said walls each including parallel first, second, third, fourth and fifth portions;
d) said second and fourth portions being disposed between said first and third portions, and between said third and fifth portions, respectively;
e) said first, third and fifth portions being substantially co-planar;
f) said second and fourth portions being substantially co-planar;
g) said second and fourth portions on one of said walls and on an opposite wall being disposed away from respective walls in the same direction;
h) means for interlocking said second and fourth wall portions disposed on one of said walls with opposite second and fourth wall portions disposed on an adjacent member; and
i) said top wall including a textured top surface.

22. A modular member for forming a base support mount for a machine and the like, comprising:
a) a box-like member having a top wall and connected first, second, third and fourth side walls and an open bottom;
b) said side walls having uniform thickness;
c) said walls each including parallel first, second, third, fourth and fifth portions;
d) said second fourth portions being disposed between said first and third portions, and between said third and fifth portions, respectively;
e) said first, third and fifth portions being substantially co-planar;
f) said second and fourth portions being substantially co-planar;
g) said second fourth portions on one of said walls and on an opposite wall being disposed away from respective walls in the same direction;
h) means for interlocking said second and fourth wall portions disposed on one of said walls with opposite second and fourth wall portions disposed on an adjacent member; and
i) said top wall including a top surface having grooves.

* * * * *